Patented June 11, 1946

2,401,743

UNITED STATES PATENT OFFICE 2,401,743

PROCESSES OF PRODUCING ETHER ALCOHOLS

Philip I. Bowman, Syracuse, N. Y., and Robert H. Barth, Ridgewood, and Harry Burrell, Paramus, N. J., assignors, by mesne assignments, to Heyden Chemical Corporation, New York, N. Y., a corporation of Delaware No Drawing. Application February 1, 1943, Serial No. 474,328

6 Claims. (Cl. 260—614)

This invention relates to a process of producing ether alcohols by the reaction of alkene oxides and pentaerythritol, polypentaerythritols and mixtures of such polyhydric alcohols. More specifically, the invention relates to new catalysts for such reactions and new reaction products which result from the use thereof.

The reaction between pentaerythritol and ethylene oxide is described in Patent No. 1,922,-459. The catalysts disclosed in said patent are boric anhydride and boric acid. The present invention relates to new reaction products formed by the catalytic action of other catalysts which give a different type of product than do boric acid and boric anhydride. This feature is one of the main novel features of the invention. Another novel feature of the invention is the formation of new ether alcohols from dipentaerythritol and from pleopentaerythritol. A further feature of the invention is the formation of new ether esters alcohols from partial esters of pentaerythritol, dipentaerythritol, and pleopentaerithritol, the preparation of which is described in copending application Serial No. 447,782, filed June 20, 1942.

In the manufacture of pentaerythritol by the condensation of acetaldehyde and formaldehyde, in addition to pentaerythritol itself, smaller amounts of hydroxylated substances are also obtained. One of these substances, which is obtained in a considerable amount, is dipentaerythritol, which is an ether having the following structure:

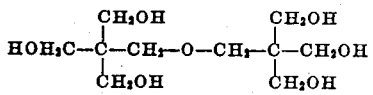

(See Brün, "Ueber den Dipentaerythrit," Wilhelm Greven, Krefeld, 1930.) Another hydroxylated substance, which is obtained in somewhat smaller amounts, is white and crystalline, melts at 230° C. to 240° C., and has a hydroxyl content of 33 per cent. It is related to dipentaerythritol in that it contains pentaerythritol residues bound by ether linkages. Regardless of chemical structure, for purposes of definition in this specification and in the claims, this substance will be termed "pleopentaerythritol."

Pleopentaerythritol is a mixture composed primarily of dipentaerythritol and tripentaerythritol, together with some pentaerythritol and a minor amount of other compounds which, according to the best evidence available, includes other related alcohols. It is the residue remaining after the separation of the major amount of pentaerythritol and dipentaerythritol from the reaction product resulting from the condensation of formaldehyde and acetaldehyde in the presence of an alkali.

Dipentaerythritol, tripentaerythritol and pleopentaerythritol may be grouped together under the generic term "polypentaerythritols," by which term is meant those compounds having higher molecular weights than pentaerythritol which are formed either actually or theoretically by etherifying one or more of the hydroxyl groups of pentaerythritol with other pentaerythritol residues.

One of the objects of this invention is to prepare a new series of reaction products by the reaction of alkene oxides and polypentaerythritols. These new products are of interest as intermediates in the chemical, pharmaceutical, plastic, and varnish industries.

A still further object of the invention is to prepare from pentaerythritol or polypentaerythritols or their partially esterified reaction products, new hydroxy ethers by reaction with alkene oxides. These hydroxy ethers may be further esterified, if desired, and may be used as plasticizers or emulsifiers. Such products are more fully described in the examples hereinafter.

A further object of the invention is to provide new catalysts for the reaction of alkene oxides with pentaerythritol or polypentaerythritols. The term catalyst in this specification is applied to an agent, added in small amounts, which directs the course and influences the speed of the reaction, and which may or may not come out of the reaction unchanged. Boric acid and boric anhydride, which have been heretofore disclosed in Patent No. 1,922,459, are not true catalysts; in fact they inhibit the reaction of alkene oxides with pentaerythritol compounds, as is shown in Example 2 hereinafter.

Catalysts for use in the process of our invention and which decrease the time of reaction, lower the temperature at which the reaction occurs, and increase the amount of alkene oxides which reacts are the following: acetic acid and higher fatty acids, acetic anhydride and higher fatty acid anhydrides, acetyl chloride, and higher acid chlorides, pentaerythritol esters, both partial and complete, including dipentaerythritol and pleopentaerythritol esters, and polyhydric alcohol esters, both complete and partial esters, particularly acetates. These varied materials are similar in one respect, and that is that upon heating with pentaerythritol they probably either undergo esterification in part with, or exchange their acid group, with the pentaerythritol compound so that in the end there is probably present a small amount of a hydroxy fatty acid ester of pentaerythritol, or dipentaerythritol, or other polypentaerythritol. This reacts rapidly with the alkene oxide. The ester groups are exchanged by the alkene oxide, and being free, can activate other pentaerythritol molecules. The boric acid or anhydride is not as active as the herein disclosed catalysts, particularly those involving the acetate radical.

The reactions of pentaerythritol and alkene oxides can be carried out in steel autoclaves capable of withstanding the vapor pressure of the alkene oxide. Of course, a suitable safety factor should be employed in the design of the autoclave. The heat applied should be carefully regulated so as not to "over shoot" the desired temperature. Good mixing is essential. Pressures and temperatures should be controlled.

Alkene oxides which may be used include ethylene oxide, propylene oxide, and epichlorohydrin. The reactions require anywhere from 2 to 20 hours at temperatures ranging from 110° C. (using the acetate type of catalyst) to 175° C. (using boric acid or no catalyst). The reaction is judged to be complete when the pressure drops nearly to atmospheric.

The following examples and comparative examples illustrate the invention:

*Comparative Example 1.*—Pentaerythritol or a polypentaerythritol, as specified in Table I hereinafter, was mixed with the specified alkene oxide in a steel autoclave (which was externally heated, the temperature being controlled electrically) in the specified ratio of definite molecular equivalents of alkene oxide to hydroxyl groups. For example, one molecular proportion of penetaerythritol, which has four hydroxyl groups, was reacted with four molecular proportions of ethylene oxide to give the first product listed in Table I hereinafter. The time required for the reactions varied from about two hours at 175° C. to eight hours at 150° C., but each reaction mixture was heated for 10 hours at the specified temperature. Boric acid was used as the catalyst in an amount equal to 0.10 to 0.15 per cent of the total weight of reactants. The products which were obtained and their characteristics are described in Table I.

Table I

*Reaction products obtained with boric acid catalyst*

| Starting hydroxy compound | Alkene oxide used | Mols of alkene oxide used per OH group | Temperature | Percent OH in product | Description of product |
|---|---|---|---|---|---|
| | | | ° C. | | |
| Pentaerythritol | Ethylene oxide | 1 | 150 | 21.4 | Liquid, viscous, pale yellow B. P. 250-230° C. at 2 mm. |
| Do | do | 2 | 175 | 14.0 | Liquid, less viscous than above, pale yellow. |
| Technical pentaerythritol | do | 1 | 175 | 20.9 | Liquid, viscous, pale yellow. |
| Technical dipentaerythritol | do | 1 | 175 | 22.0 | Very viscous, pale yellow liquid. |
| Do | do | 2 | 175 | 14.9 | Less viscous than above, pale yellow liquid. |
| Pleopentaerythritol | do | 1 | 175 | 21.9 | Heavy paste, having gel-like structure. |
| Dipentaerythritol | Propylene oxide | 0.84 | 175 | 18.0 | Very viscous, cloudy liquid. |
| Do | Epichlorohydrin | 1 | 175 | | Dark brown, very viscous liquid. |
| Pentaerythritol | Ethylene oxide | 0.5 | 150 | | Viscous pale yellow liquid, cloudy. |

Some of the products obtained as described in Comparative Example 1 were reacted with acetic and propionic anhydrides and mixtures of anhydrides, and others were esterified with fatty acids themselves, as described in copending application Serial No. 378,052, filed February 8, 1941 (Patent No. 2,356,745), and in ways known to those skilled in the art. The resulting new compounds varied from viscous oils to colorless oily liquids which were compatible with nitrocellulose, cellulose acetate and vinyl chloride acetate.

*Example 1.*—A partial ester of pentaerythritol or a polypentaerythritol as specified in Table II hereinafter was heated with the specified alkene oxide as described in Comparative Example 1 at a temperature between 150° C. and 175° C. in a steel autoclave for the specified period. One mol of alkene oxide per free hydroxyl group was added in each case, although, as indicated in Comparative Example 1, more mols of alkene oxide could have been used to give a higher molecular weight product. In these reactions no additional catalyst was used, since the partial ester serves as its own catalyst.

Table II

| Starting partial ester | Alkene oxide | Temperature | Time of heating, hours | Nature of product |
|---|---|---|---|---|
| | | ° C. | | |
| Dipentaerythritol monomyristate | Ethylene oxide | 175 | 24 | Viscous oil. |
| Pentaerythritol monostearate | do | 175 | 10 | Soft wax. |
| Dipentaerythritol triacetate | do | 175 | 10 | Viscous liquid. |
| Technical pentaerythritol monostearate | do | 150 | 10 | Soft wax. |
| Pentaerythritol monocaprate | do | 175 | 10 | Viscous oil. |
| Dipentaerythritol mono soy bean fatty acid ester | do | 175 | 10 | Do. |

*Example 2.*—The effect of various catalysts on the reaction of dipentaerythritol and ethylene oxide was studied, using the following general procedure.

One molecular proportion of dipentaerythritol was mixed with 30 molecular proportions of ethylene oxide together with the specific quantity of catalyst in a steel autoclave, and the mixture was heated to 175° C. The time required to reach 175° C. was approximately 5 hours, and an additional 8 hours were allowed to complete the reaction. The quantity of catalyst which was added was 0.13% of the total weight of reactants. The product was boiled to remove the excess ethylene oxide, and the residue weighed. The hydroxyl value was also determined as a check on the amount of ethylene oxide reacted. From the analytical data, the mols of ethylene oxide per hydroxyl group which reacted were calculated, and the results are as specified hereinafter following in Table III:

TABLE III

| Catalyst | Number of mols of ethylene oxide reacted per hydroxyl group |
|---|---|
| Boric anhydride | 2 |
| Boron fluoride ethyl ether | 2 |
| Boric acid | 2 |
| Sulfuric acid 98% | 1½ |
| Benzyl sulfonyl chloride | 0 |
| No catalyst | 3 |
| Acetic acid | 5 |
| Pentaerythritol diacetate | 5 |
| Pentaerythritol tetraacetate | 5 |
| Acetic anhydride | 5 |
| Benzoyl chloride | 3½ |

It is evident from the table that the use of the acetate radical as a catalyst, whether added as the free acid, anhydride, or ester, promotes the reaction of a large number of mols of ethylene oxide; and that the use of boric acid, etc., results in limited reaction even in the presence of a large molecular excess of ethylene oxide. The amount of ethylene oxide which actually reacted when boric acid is used as a catalyst is even less than the amount which reacted without any catalyst whatsoever.

*Example 3.*—This example serves to show the differences in the reaction products which result when two different catalysts are used, namely (1) boric acid and (2) pentaerythritol tetraacetate.

A mixture of 544 parts (approximately 4 molecular parts) of pure pentaerythritol (melting point 260–262° C.) and 704 parts (approximately 16 molecular parts) of ethylene oxide were heated in two separate experiments with 1.7 parts of boric acid and 1.7 parts of pentaerythritol tetraacetate, respectively. Both reactions were complete. The one using boric acid required 17 hours at 125° C. and 4 hours at 150° C. to complete. The one using the pentaerythritol tetraacetate required 16 hours at 110° C. to complete, as indicated by a pressure drop to atmospheric. The reaction products in each case were subjected to vacuum distillation.

In the case of the boric acid catalyzed reaction mixture, 60 per cent distilled between 250° C. and 260° C., 20 per cent between 260° C. and 280° C., and 20 per cent between 280° C. and 290° C., at a pressure of 2 mm. of mercury. In the case of the pentaerythritol tetraacetate catalyzed reaction product, 23.3 per cent distilled between 234° C. and 245° C., 13.3 per cent between 246° C. and 255° C., 13.3 cent between 256° C. and 265° C., 10 per cent between 266° C. and 275° C., 13.3 per cent between 276° C. and 285° C., 13.3 per cent between 286° C. and 306° C., and 13 per cent residue (above 306° C.) at a pressure of 3 mm. of mercury. Hydroxyl values and refractive index measurements on fractions of each distillation together with the boiling points, as given in Tables IV and V, indicate that while both products are mixtures, they are mixtures of different compounds whose constitutions have not as yet been determined.

TABLE IV

*Distillation of pentaerythritol-ethylene oxide reaction product—Boric acid catalyst*

| Fraction | Boiling range, °C. at 2 mm. | Percent of total weight | Percent OH | Refractive index |
|---|---|---|---|---|
| 1 | 250–260 | 60 | 24.7 | 1.481 |
| 2 | 260–280 | 20 | 20.2 | 1.490 |
| 3 | 280–290 | 20 | 16.9 | 1.479 |
| Residue | | (¹) | | |

¹ Very little.

TABLE V

*Distillation of pentaerythritol-ethylene oxide reaction product—Pentaerythritol tetraacetate catalyst*

| Fraction | Boiling range, °C. at 3 mm. | Percent of total weight | Percent OH | Refractive index |
|---|---|---|---|---|
| 1 | 234–245 | 23.3 | 28.8 | 1.479 |
| 2 | 246–255 | 13.3 | 24.3 | 1.482 |
| 3 | 256–265 | 13.3 | 21.8 | 1.481 |
| 4 | 266–275 | 10.0 | 20.2 | 1.480 |
| 5 | 276–285 | 13.3 | 18.9 | 1.478 |
| 6 | 286–306 | 13.3 | 16.1 | 1.478 |
| Residue | Over 306 | 13.0 | 13.1 | |

Reference is made to our copending application Serial No. 545,888, filed July 20, 1944, which claims subject matter originally disclosed but not claimed herein.

Having thus described our invention, what we claim as new and desire to secure by Letters Patent is:

1. A process of preparing an ether alcohol which consists in heating together under pressure an excess of an alkene oxide with an alcohol selected from the group consisting of pentaerythritol and polypentaerythritols in the presence of a catalyst selected from the group consisting of carboxylic acids, their anhydrides, their chlorides, and partial and complete esters of carboxylic acids and polyhydric alcohols.

2. A process of preparing an ether alcohol which consists in heating together under pressure an excess of an alkene oxide with an alcohol selected from the group consisting of pentaerythritol anl polpentaerythritols in the presence of acetic anhydride.

3. A process of preparing an ether alcohol which consists in heating together under pressure an excess of an alkene oxide with an alcohol selected from the group consisting of pentaerythritol and polypentaerythritols in the presence of pentaerythritol diacetate.

4. A process of preparing an ether alcohol which consists in heating together under pressure an excess of an alkene oxide with an alcohol selected from the group consisting of pentaerythritol and polypentaerythritols in the presence of pentaerythritol tetra-acetate.

5. A process of preparing an ether alcohol which consists in heating together under pressure an excess of an alkene oxide with a polypentaerythritol in the presence of a catalyst selected from the group consisting of carboxylic acids, their anhydrides, their chlorides, and partial and complete esters of carboxylic acids and polyhydric alcohols.

6. A process of preparing an ether alcohol which consists in heating together under pressure an excess of an alkene oxide with a polypentaerythritol in the presence of acetic anhydride.

PHILIP I. BOWMAN.
ROBERT H. BARTH.
HARRY BURRELL.